(12) United States Patent
Philpot et al.

(10) Patent No.: US 9,354,136 B1
(45) Date of Patent: May 31, 2016

(54) METHOD FOR DETERMINATION OF MULTIPLE SHRAPNEL HITS ON A BALLISTIC TARGET THREAT

(71) Applicants: Brian Philpot, Conroe, TX (US); Doug Heermann, Conroe, TX (US)

(72) Inventors: Brian Philpot, Conroe, TX (US); Doug Heermann, Conroe, TX (US)

(73) Assignee: INVOCON, INC., Conroe, TX (US)

( * ) Notice: Subject to any disclaimer, the term of this patent is extended or adjusted under 35 U.S.C. 154(b) by 141 days.

(21) Appl. No.: 14/328,688

(22) Filed: Jul. 10, 2014

Related U.S. Application Data

(60) Provisional application No. 61/844,431, filed on Jul. 10, 2013.

(51) Int. Cl.
| | | |
|---|---|---|
| *G01M 7/00* | (2006.01) | |
| *G01N 3/00* | (2006.01) | |
| *G01N 33/00* | (2006.01) | |
| *G01M 5/00* | (2006.01) | |

(52) U.S. Cl.
CPC .......... *G01M 5/0033* (2013.01); *G01M 5/0091* (2013.01)

(58) Field of Classification Search
None
See application file for complete search history.

(56) References Cited

U.S. PATENT DOCUMENTS

| | | | | |
|---|---|---|---|---|
| 5,280,751 A | * | 1/1994 | Muirhead | F42B 12/365 102/210 |
| 6,669,477 B2 | * | 12/2003 | Hulet | F41J 5/12 273/372 |
| 7,278,290 B1 | * | 10/2007 | Hughes | C09K 9/00 264/103 |
| 7,660,692 B2 | * | 2/2010 | Van Albert | A61B 5/6805 702/127 |
| 7,685,862 B1 | * | 3/2010 | Hughes | F41J 5/056 273/372 |
| 8,279,425 B1 | | 10/2012 | Heermann et al. | |
| 8,307,694 B1 | | 11/2012 | Kiefer et al. | |
| 8,316,690 B1 | | 11/2012 | Kiefer et al. | |
| 9,081,409 B2 | * | 7/2015 | Soles | G08B 13/126 |

* cited by examiner

*Primary Examiner* — Peter Macchiarolo
*Assistant Examiner* — Jermaine Jenkins
(74) *Attorney, Agent, or Firm* — Kenneth A. Roddy

(57) ABSTRACT

A method and system for determination of multiple shrapnel hits on a gridless target surface utilizes multiple radio frequency or acoustic emission transducers on the target surface to detect energy waves created by the impact of shrapnel on the surface that occur at the point of initial contact and after the initial impact. Data regarding the detection, timing, and location of multiple impact events is acquired and transmitted to a remote processing location where the data is processed to determine the timing and location of all the shrapnel hits and derive final lethality information.

4 Claims, 2 Drawing Sheets

METHOD FOR DETERMINATION OF MULTIPLE SHRAPNEL HITS ON A BALLISTIC TARGET THREAT

CROSS REFERENCE TO RELATED APPLICATION

This application claims priority of U.S. Provisional Application Ser. No. 61/844,431, filed Jul. 10, 2013.

BACKGROUND OF THE INVENTION

1. Field of the Invention

This invention relates generally to methods and systems for determining the impact point and damage propagation in a detection surface and, more particularly, to a method for determination of multiple shrapnel hits on a ballistic target threat.

2. Background Art

The Department of Defense (DOD) of the U.S. government has developed anti missile technology to protect the United States and allied interests against attack by different threat missiles. Threats may be ballistic in nature. That is, they are carried outside of the atmosphere by a rocket to extend the range of the weapon and subsequently re-enter the atmosphere and are guided to their intended target by external commands or internal guidance logic. Other threats may fly close to the earth to avoid radar and other short range defense systems via speed and maneuverability at "map of the earth" altitudes.

Defensive missiles have been designed as "hit-to-kill" weapons where a kinetic warhead (KW) on the killer (defensive) missile acquires the target threat and is guided to that target via external inputs as well as internal sensors and logic. This technique is adequate for many types of threat missiles. However, new threats may require a different approach to the "end game" kill scenario. This new technology is referred to as a "shrapnel kill" weapon. It is to missiles as a shot gun is to a goose hunter. The killing mechanism is not a simple one-piece kinetic warhead (KW); but, instead, it explodes into many shrapnel fragments when sensors indicate it is close enough to the target. The shrapnel fragments maintain the forward velocity of the killer missile as well as the additive acceleration and final velocity provided by the fragmenting explosive. This process is similar to a WW2 technology for hand grenades.

"Hit to Kill" weapons have been judged for their accuracy by lethality assessment systems that are installed and flown within the payloads of the "threat representative" target missiles. Historically, most impact and lethality assessment systems and methods for determining the impact point and damage propagation in a detection surface, such as ballistic missile intercepts, micrometeoroids and orbital debris (MMOD) or other shock events typically utilize wire or optical grids that form a mesh over the surface of the target missile. These grid systems report the initial hit point by monitoring the X/Y matrix of the grid and accurately determine the timing and sequence of broken conduction paths. This data is compiled and transmitted off of the target missile very quickly so as to avoid inevitable destruction of the target by the killer missile.

The conventional lethality assessment capability is dependent upon the X/Y grids created by the optical or wire conductors. This technique works well for "Hit to Kill" weapons since there will only be one impact. However, in a "Shrapnel Kill" environment, each target missile may take many hits from the shrapnel generated from the explosion of the warhead from the kill vehicle. Conventional wire/optical grids ignore a wire or optical path when it is broken rendering it useless, thus, it is impossible utilizing current lethality assessment methods to accurately record multiple random hits from shrapnel on a grid because once a path is broken by one hit, future hits, involving that conductive path, are not detected and, as a result, would create incorrect tabulation of the multiple hits from the shrapnel kill vehicle. Thus, there is a need for a new lethality assessment technology that would be useful in shrapnel kill systems Invocon, Inc., of Conroe, Tex. has developed and patented several lethality assessment systems that employ a "wireless hit grid" that utilizes impact energy to locate the exact point of initial contact and damage propagation in the detection surface. The following are some examples.

Heermann et al, U.S. Pat. No. 8,279,425, assigned to Invocon, Inc., commonly owned with the present application, and incorporated herein by reference in its entirety, discloses a frequency domain reflectometry (FDR) lethality assessment method and system for determining impact point and damage propagation in detection surface that utilizes frequency domain reflectometry (FDR) to determine impact point and damage propagation faults in the detection surface. The detection surface has a conductive layer capable of propagating radio frequency (RF) signals. At least one signal transmit/receive port on the detection surface injects a radio frequency (RF) interrogation signal into the detection surface and at least two signal receive-only ports on the detection surface spaced a distance apart from each other and from the signal transmit/receive port receive reflected radio frequency (RF) signals of the interrogation signal. A frequency domain reflectometry measurement system coupled with the transmit/receive port and signal receive-only ports measures frequency responses of the ports compared to predetermined baseline measurements and determines the precise location of an impact point and damage propagation fault in the detection surface by triangulation.

Kiefer et al, U.S. Pat. No. 8,307,694, assigned to Invocon, Inc., commonly owned with the present application, and incorporated herein by reference in its entirety, discloses a hypervelocity impact detection method and system for determining the precise impact location in a detection surface, of impacts such as ballistic missile intercepts, micrometeoroids and orbital debris (MMOD) or other shock events, that utilizes a gridless detection surface capable of propagating radio frequency (RF) impact detection signals responsive to receiving hypervelocity impacts from objects, and multiple sensors on the detection surface that directly measure radio frequency RF emissions generated by the hypervelocity impacts on the surface, and a time of arrival (TOA) position measurement technique for determining the precise impact location in the detection surface.

Kiefer et al, U.S. Pat. No. 8,316,690, assigned to Invocon, Inc., commonly owned with the present application, and incorporated herein by reference in its entirety, discloses a hypervelocity impact and time of arrival detection method and system for detecting hypervelocity impacts on a detection surface utilizing multiple sensors that directly measure electrical pulse radio frequency (RF) emissions generated by hypervelocity impacts on the detection surface and time of arrival (TOA) position measurements for determining the precise impact location on the detection surface. The detection surface material is compressed differentially in such a way that the inherent equalization of the compressed electron density in one area of the impact is directed to the uncompressed area of the material causing an electrical current that flows until the redistribution of the electrical charge has been completed and the rapid redistribution of charge and inherent current that results emits the radio frequency pulse that is induced into the detection surface.

SUMMARY OF THE INVENTION

The present invention overcomes the aforementioned problems is distinguished over the prior art in general, by a lethality assessment technology that is particularly useful in "Shrapnel Kill" detection systems. The lethality assessment system employs a "wireless hit grid" that utilizes impact energy to locate the exact point of initial contact and damage propagation in a detection surface. Multiple transducers are placed on the detection surface and tuned to detect energy waves (acoustic or RF) created by the impact of shrapnel on the surface that are transmitted outward from each of the impact points. Installation spacing of the transducers is determined by outputs from multiple transducers that can be used to detect and locate shrapnel impacts that occur at the point of initial contact and after the initial impact. To accomplish the detection, timing, and location information of multiple impact events, data is acquired and transmitted to the ground or to a remote processing location where the data is processed to determine the timing and location of all the shrapnel hits. The hardware for energy measurement utilizes multilevel high speed comparators and a rectification and integrator circuit that "envelope" the impact pulse energy for a limited time. This time limit allows the integration of the expansion waves that are stable in the frequency domain and limit the energy from the deformation waves that follow that are actually composite energy from the impact and the impulse response of the structure. The electronics transmit data from the target that forms a multidimensional matrix of impact times and impact energy collected by each of the transducers on the target surface. The resolution of hit locations and shrapnel counts is not carried out on the target vehicle. The data needed for calculations is sent off from the target vehicle to the ground or to a remote post processing location where it is processed to derive final lethality information. The analysis process is based upon iterative algorithm best-fit matching.

DETAILED DESCRIPTION OF THE INVENTION

The present invention utilizes lethality assessment technology that is particularly useful in "Shrapnel Kill" detection systems. As discussed above, Invocon, Inc., of Conroe, Tex. has developed and patented several lethality assessment systems that employ a "wireless hit grid" that utilizes impact energy to locate the exact point of initial contact and damage propagation in a detection surface. This capability has been proven in flight and ground testing where a kinetic warhead (KW) was the impact device. In addition, ground testing has been conducted with two wireless hit grid targets subjected to a shrapnel explosion. The initial results indicate an ability to detect the first shrapnel impact and its location on the target. The post impact analysis demonstrated outputs from multiple transducers that can be used to detect and locate shrapnel impacts that occur after the initial impact. To accomplish the detection, timing, and location information of multiple impact events, data must be acquired and transmitted to the ground or to a remote processing location where the data is processed to determine the timing and location of all the shrapnel hits.

The present hardware and data processing method is unique to a shrapnel kill application, and leads ultimately to the end-game analysis of damage inflicted to the target surface by the killer missile.

Detection Surface

Figure 1:
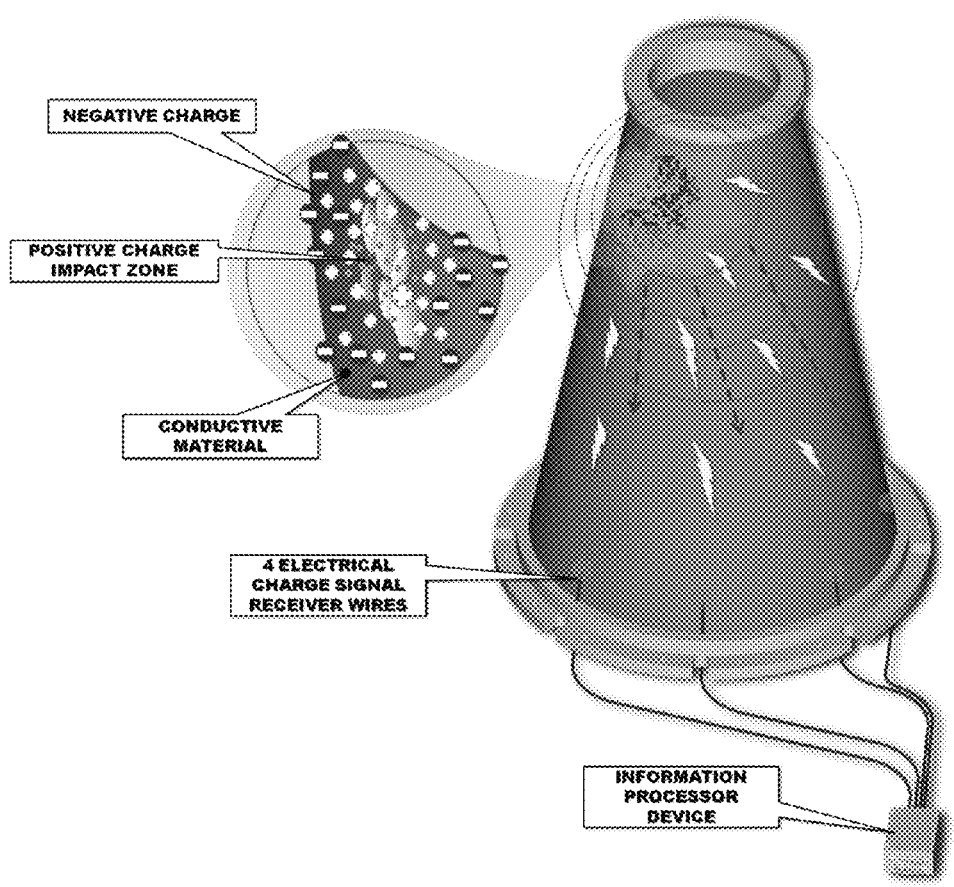
FIG. 1 is a schematic illustration of a first example of a detection surface utilizing radio frequency (RF) transducers that may be used to implement the multiple shrapnel impact detection system and method of the present invention.

FIG. 1 illustrates, schematically, a first example of a gridless detection surface or target surface that may be used to implement the multiple shrapnel impact detection system and method of the present invention wherein the impacts cause an electrical current and charge resulting in emitting a radio frequency (RF) pulse that is induced into the detection surface.

Unlike a "detection grid", in which a wire grid forms a mesh over the surface and wire breaks within that grid are detected upon impact, the present gridless "detection surface" may be an electronically conductive surface, at least two noncontiguous surfaces joined to allow electrical coupling between the surfaces, an inner conductor layer sandwiched between two dielectric layers with conductive ground planes connected at an edge of the detection surface, or combinations thereof. The material selection and thickness of the dielectric layers are critical to the surface design as they contribute to the frequency selectivity as well as the propagation velocity of signals in the surface. In the present system, the detection surface is constructed as described above and is provided with at least three pulse detection points.

When a hypervelocity impact takes place, the target material is compressed differentially in such a way so that the inherent equalization of the compressed electron density in one area of the impact is directed to the uncompressed area of the material and thus an electrical current flows until the redistribution of the electrical charge has been completed. This rapid redistribution of charge and the inherent current that results emits a radio frequency pulse that is induced into the conductive target surface as well as radiated into the atmosphere. These pulses are relatively high voltage (proportional to the size and velocity of the impact) and can be captured via conduction on the surface or radio frequency antennas within the range of the radiated signal. This pulse creation at the hypervelocity impact can be detected as it travels through the conductive surface of the target material—i.e. the skin of an aircraft, missile, or spacecraft.

Figure 2:
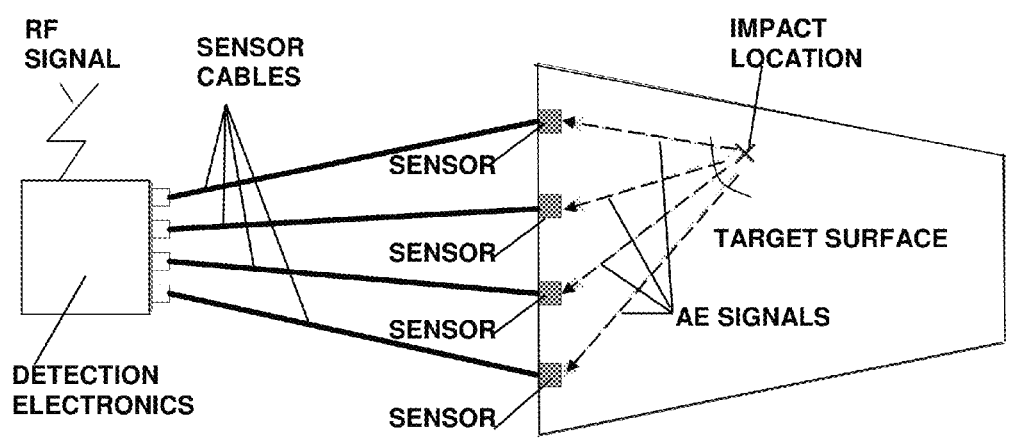
FIG. 2 is a schematic illustration of a second example of a detection surface utilizing acoustic emission (AE) transducers that may be used to implement the multiple shrapnel to implement the multiple shrapnel impact detection system and method of the present invention.

FIG. 2 illustrates, schematically, a second example of a gridless detection surface or target surface that may be used to implement the multiple shrapnel impact detection system and method of the present invention wherein at least three acoustic emission (AE) sensors are secured to the target surface for triangulation and connected via respective cables to the detection electronics located a distance from the target surface. The detection electronics include digital signal processing electronics for processing AE signals and a RF signal transmitter for transmitting data to a remote location.

Shrapnel Kill System and Method

In the present system, the transducer distribution on the target is configured to the limitations of the structure. Multiple transducers are placed on the target and tuned to detect the energy waves (acoustic or RF) created by the impact of shrapnel on the surface that are transmitted outward from each of the impact points. Installation spacing of the transducers is determined by:

(1) the speed of the energy waves from the impacts;
(2) the estimated time to demise of the target payload electronics;
(3) the calculated time of the impulse response of the target structure; and
(4) the maximum travel time of energy from any impact location to at least 3 transducers.

It has been shown by ground testing that multiple impacts, distributed in time, will be detected and reported by each of the transducers on the target surface. The transducers respond to expansion waves that have been shown to be stable in the frequency domain while displaying little more than amplitude attenuation as a result of structural anomalies.

The present invention overcomes the problem of distinguishing between separate impacts. This is a problem because one hit (T-0) will cause a response from the transducer nearest to the impact point and subsequent transducers will respond with a detection at T+ the travel time from impact to the most distant of the closest three transducers. Calculations of these three travel times, converted to distance, will locate the impact point for the first shrapnel hit.

If a second shrapnel hit occurs that is closer to any one of the first three transducers involved in the calculation of the initial hit point, that second shrapnel hit could cause a detection that is "out of order" relative to the first hit point. Due to the conical geometry of the target and the temporal displacement of the shrapnel (due to the generally spherical shape of the expanding shrapnel pattern), the opportunity for exactly simultaneous impacts only occurs at the intersection of the two geometric shapes. This is a line on the target that occurs only if a radius of the sphere is perpendicular to the surface of the target. Since the sphere shape of the expanding shrapnel pattern is intersecting with a conical surface on the target, it forms a straight line on the cone (conical surface). All shrapnel that will intersect with that line are distributed in time as a function of the diameter of the shrapnel sphere. This case is the worst possible case for simultaneous hits that must be differentiated. If the radius of the shrapnel sphere is at any other angle to the line on the cone, the temporal distribution of the impacts on that line would be increased due to the angle of the line relative to the incoming radius pattern of the shrapnel.

In the present system, all transducers report all shrapnel impact detections and the times of those detections (relative to the first detection time) for the duration of the intercept process or until the destructive process of the kill vehicle renders the lethality assessment system inoperative.

The electronic hardware utilized to accomplish the initial detection is identical or similar to the hardware shown and described in U.S. Pat. Nos. 8,279,425; 8,307,694; and 8,316,690; assigned to Invocon, Inc., which are hereby incorporated by reference to the same extent as if fully set forth herein. This incorporation-by-reference is for the purpose of simplifying the drawings and descriptions of the present invention and, also for the purpose of providing a clear and concise description of this invention. The reader may refer to the above patents for a more detailed description of particular hardware components of the present system.

In order to differentiate rapid impacts, the present system must also resolve a measure of energy as well as the timing data used for location. The hardware for energy measurement utilize multilevel high speed comparators and a rectification and integrator circuit much like those used on older radar detectors. The aforementioned circuitry will "envelope" the impact pulse energy for a limited time. This time limit allows the integration of the expansion waves that are stable in the frequency domain and limit the energy from the deformation waves that follow that are actually composite energy from the impact and the impulse response of the structure.

The electronics transmit data from the target that forms a multidimensional matrix of impact times and impact energy collected by each of the transducers on the target surface. The resolution of hit locations and shrapnel counts is not carried out on the target vehicle. The timeline from the initial impact to the functional destruction of the target will be less than 100 microseconds. Thus, there is not time for (onboard) calculation. The data needed for calculations is sent off from the target vehicle to the ground or to a remote post processing location where it is processed to derive final lethality information.

The ground analysis process is based upon iterative algorithm best-fit matching. The shape of the target, the physical locations of the transducers, and the impedance of the structure are known to the ground or remote processing algorithms. The analysis process models all possible spherical sizes and the associated spatial density of the shrapnel patterns. The basis for these models is accomplished by ground arena testing wherein the patterns and densities are verified by weapon distance from various targets designed to register all shrapnel hits. In addition, the model would represent the size shape and transducer location on the target missile cone. The basis for this model represents the known dimensions and locations of the transducers for the target involved in the intercept.

The analysis begins by calculating all possible intercept angles and detonation distances from the target. Each case would arrive at a time of arrival (TOA) of hit energy at the array of transducers. However, only one of the possible solutions would be a close match to the actual times and hit energy levels transmitted from the target prior to demise. The angle and timing best matching the actual times of arrival would be the resulting angle of impact, the location of each impact, and the actual number of shrapnel impacts on the target.

In the Example of FIG. 2, the acoustic emission (AE) sensors are AE transducers and may be based on different physical principals. One type utilizes piezoelectric crystalline structures which may be naturally occurring geology or may be man-made crystal structures, also piezoelectric. The man-made structures may also include thin films of piezoelectric deposition that resembles thick scotch tape. This material can be shaped and bonded to the inside of the target missile skin to accommodate variability in the surface of the target missile. The thin film transducers may be installed as long strips or individual spot patches. The shape of the thin film transducer is designed to enhance the clarity and amplitude of the signal that results from the acoustic waves resulting from the hypervelocity impact. The shape of the transducer and it's placement on the target surface is designed in concert with the digital processing of the resulting time of arrival signals in order to optimize the calculated location of the initial hit point.

After installation of the transducers, non-destructive calibration impacts are created at known points on the target in order to provide transfer functions that can be applied to the raw data reported by the impact detection system after receipt of the raw data via ground receivers. For example, (a) thin strip transducers may be installed in an X/Y pattern over critical areas of the target where maximum processing speed is needed to complete the detection and radio frequency transmission of the raw data prior to the impact demise of the system due to the kill vehicle impact; and (b) constellations of spot transducers may be placed at strategic locations on the target so that multiple times of arrival can be detected locally at acoustic speeds and subsequently sent to the processing electronics over wire at the speed of light.

These features increase the ability of the present lethality assessment system and method to be effectively deployed in intercept situations where the relative intercept velocity is extremely high, thus, minimizing the risk that the high closing velocity damage can "out run" the relatively slow acoustic travel time.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A method for determining the impact and damage propagation in a conical target surface of shrapnel hits that occur at the point of initial impact and after the initial impact utilizing acoustic emission or radio frequency energy waves created by the impact of shrapnel on the target surface, comprising the steps of:
   providing a gridless conical target surface comprising an electronically conductive material operative to emit and propagate acoustic emissions (AE) or electromagnetic radio frequency (RF) impact detection signals responsive to receiving impacts from shrapnel, a plurality of acoustic emission (AE) or radio frequency (RF) transducers disposed on said detection surface and calibrated to detect acoustic or radio frequency energy waves created by an initial impact and subsequent impacts on the target surface that are transmitted outward from each of the impact points; and
   providing electronic energy measurement means comprising multilevel high speed comparators, a rectification and integrator circuit coupled with said transducers configured to envelope the impact pulse energy for a limited time sufficient to allow integration of the expansion waves that are stable in the frequency domain and limit the energy from the deformation waves that follow, said deformation waves comprising composite energy from the impact and the impulse response of the detection surface, and radio frequency transmission means coupled with said electronic measurement means;
   transmitting via said radio frequency transmission means, raw data from said target surface representing a multi-dimensional matrix of impact times of arrival and impact energy collected by each of said transducers to a remote processing location; and
   at said remote processing location, processing said raw data to derive final lethality information comprising resolution of hit locations and shrapnel counts.

2. The method according to claim 1, wherein
said plurality of transducers are located on said target surface and calibrated to detect acoustic emission or radio frequency energy waves created by said shrapnel impacts by:
   the speed of the energy waves from said impacts;
   the estimated time to demise of payload electronics of said target surface;
   the calculated time of the impulse response of said target surface; and
   the maximum travel time of energy from any impact location to at least three said transducers.

3. A system for determining the impact and damage propagation in a conical target surface of shrapnel hits that occur at the point of initial impact and after the initial impact utilizing acoustic emission or radio frequency energy waves created by the impact of shrapnel on the target surface, comprising:
   a gridless conical target surface comprising an electronically conductive material operative to emit and propagate acoustic emissions (AE) or electromagnetic radio frequency (RF) impact detection signals responsive to receiving impacts from shrapnel;
   a plurality of acoustic emission (AE) or radio frequency (RF) transducers disposed on said detection surface and calibrated to detect acoustic or radio frequency energy waves created by an initial impact and subsequent impacts on the target surface that are transmitted outward from each of the impact points; and
   electronic energy measurement means comprising multi-level high speed comparators and a rectification and integrator circuit coupled with said transducers configured to envelope the impact pulse energy for a limited time sufficient to allow integration of the expansion waves that are stable in the frequency domain and limit the energy from the deformation waves that follow, said deformation waves comprising composite energy from the impact and the impulse response of the detection surface;
   radio frequency transmission means coupled with said electronic measurement means configured to transmit raw data from said target surface representing a multi-dimensional matrix of impact times of arrival and impact energy collected by each of said transducers to a remote processing location; and
   said remote processing location processes said raw data to derive final lethality information comprising resolution of hit locations and shrapnel counts.

4. The system according to claim 1, wherein
said plurality of said transducers are located on said target surface and calibrated to detect acoustic emission or radio frequency energy waves created by said shrapnel impacts by:
   the speed of the energy waves from said impacts;
   the estimated time to demise of payload electronics of said target surface;
   the calculated time of the impulse response of said target surface; and
   the maximum travel time of energy from any impact location to at least three said transducers.

* * * * *